US007159849B2

(12) United States Patent
Raynor

(10) Patent No.: US 7,159,849 B2

(45) Date of Patent: Jan. 9, 2007

(54) VEHICLE JACK POSITIONING DEVICE AND METHOD

(76) Inventor: Neil M. Raynor, 8 Canoe Brook Dr., Livingston, NJ (US) 07039

( * ) Notice: Subject to any disclaimer, the term of this patent is extended or adjusted under 35 U.S.C. 154(b) by 246 days.

(21) Appl. No.: 10/848,327

(22) Filed: May 18, 2004

(65) Prior Publication Data

US 2005/0258409 A1 Nov. 24, 2005

(51) Int. Cl.
*B66F 3/00* (2006.01)

(52) U.S. Cl. ...................................... 254/126; 254/124

(58) Field of Classification Search ................ 254/126, 254/122, 124, 418–425, 93 VA, 93 R
See application file for complete search history.

(56) References Cited

U.S. PATENT DOCUMENTS

| | | | | |
|---|---|---|---|---|
| 3,873,065 A | | 3/1975 | McCann | 254/100 |
| 3,947,839 A | | 3/1976 | Zigmant | 340/282 |
| 4,552,376 A | | 11/1985 | Cofer | 280/477 |
| 4,553,727 A | | 11/1985 | Arzouman | 248/354.7 |
| 4,558,848 A | | 12/1985 | Rutter | 254/100 |
| 4,583,713 A | | 4/1986 | Fukura et al. | 254/126 |
| 4,597,584 A | | 7/1986 | Hanser | 280/6 |
| 4,614,943 A | | 9/1986 | Boucher | 340/825 |
| 4,919,392 A | | 4/1990 | Minuto | 254/126 |
| 5,676,385 A | * | 10/1997 | Schneider et al. | 280/6.153 |
| 5,695,173 A | * | 12/1997 | Ochoa et al. | 254/122 |
| 5,722,641 A | * | 3/1998 | Martin et al. | 254/423 |
| 5,765,810 A | * | 6/1998 | Mattera | 254/423 |
| 5,901,969 A | | 5/1999 | Schneider et al. | 280/6.153 |
| 6,527,254 B1 | * | 3/2003 | Prevete | 254/423 |
| 6,619,693 B1 | * | 9/2003 | Sproatt et al. | 280/764.1 |
| 6,910,680 B1 | * | 6/2005 | Geller | 254/423 |
| 6,991,221 B1 | * | 1/2006 | Rodriguez | 254/423 |
| 2002/0008231 A1 | | 1/2002 | Glovatsky et al. | 254/418 |
| 2005/0258409 A1 | * | 11/2005 | Raynor | 254/126 |

* cited by examiner

Primary Examiner—Lee D. Wilson
(74) *Attorney, Agent, or Firm*—Lowenstein Sandler PC

(57) ABSTRACT

A novel device and method for positioning a vehicle jack in relation to a vehicle. The device uses a sensor which communicates with an indicator located at the point on the vehicle frame for proper placement of the vehicle jack, or jack point. The sensor detects the indicator's position when brought into substantial alignment and proximal range with the indicator to determine the proper position of the vehicle jack in alignment with the jack point. Upon detection of the indicator by the sensor, the display of the device provides a visual or auditory signal to the jack operator indicating location of the jack point.

37 Claims, 2 Drawing Sheets

70 VEHICLE
VEHICLE FRAME
JACK POINT
40 INDICATOR
20 SENSOR
100 WIRE
30 DISPLAY
50 JACK
81 RED LIGHT
82 GREEN LIGHT
90 BUZZER

VEHICLE JACK POSITIONING DEVICE AND METHOD

FIELD OF THE INVENTION

This invention relates to novel devices and methods for positioning a vehicle jack relative to a vehicle. Particularly, the invention relates to devices for determining the proper location on the vehicle frame for placement of the vehicle jack during operation of the jack.

BACKGROUND OF THE INVENTION

Vehicle jacks are frequently used to elevate a vehicle to facilitate vehicle maintenance and repair activities, such as changing a tire or inspecting the brakes. Virtually all vehicles require the vehicle jack to be positioned relative to and make contact with the vehicle in an optimal spot, or jack point, to effectuate efficient and safe operation of the jack. The jack point is determined by the vehicle manufacturer based on the features of the vehicle and associated lift equipment, such as vehicle weight, tire size and jack size. The jack point is often described in the vehicle owner's manual and/or indicated on the vehicle by a recess or depressed area on the underside of the vehicle frame.

However, on many vehicles, the jack point is difficult to locate and determine with any accuracy. Because the jack point is generally located on the underside of the vehicle frame near the vehicle wheels, the proper position for the jack is often difficult to determine by feel or visual inspection. Additionally, the instructions provided in an owner's manual are often imprecise or ambiguous. Often jack operators are guided by only their visual inspection of the vehicle frame resulting in an imprecise estimate as to the proper jack point. Further, determination of the proper jack point is particularly difficult when jack operation is conducted in the dark; during inclement weather; on a vehicle frame residing low to the level surface; and/or by an operator having physical or ocular limitations or impairments. Additionally, structural indicators provided on the vehicle frame at the proper jack point can wear away, fade and lose definition, often due to rusting on the underside of the vehicle frame.

Operation of a jack in an improper position relative to the vehicle can damage the vehicle or cause the vehicle to slip off the jack and expose the operator to physical injury. Accordingly, there is a need in the art for a device which can assist the jack operator in determining the proper placement of the vehicle jack relative to the vehicle.

SUMMARY OF THE INVENTION

The invention provides devices for positioning a vehicle jack to contact the vehicle at the proper jack point along the vehicle frame prior to operation of the vehicle jack. Particularly, it provides a small battery-operated device adapted to attach to the vehicle jack, the device having a display to indicate to the user by either light, sound or both when the jack is in the correct position. The device comprises a sensor which detects an indicator located on the proper jack point of the vehicle frame when the sensor is brought into sufficient proximity with the indicator. The sensor of the device can attach to the vehicle jack, preferably, at or near the point of the jack which makes contact with the vehicle during operation of the jack. In one embodiment, the sensor is a pad placed on top of the jack. In another embodiment the sensor is made integral with the vehicle jack at the point of the jack which makes contact with the vehicle during operation of the jack. In still another embodiment, the indicator is located on the vehicle jack and the sensor is located on the vehicle at the jack point.

In one embodiment, the indicator and sensor comprise magnetic elements which communicate magnetically with one another. In another embodiment, the indicator comprises a light-producing device, and the sensor comprises a light-detecting device capable of detecting the light produced by the indicator.

The methods and devices of the invention are useful to assist the jack operator in determining the proper position of the jack and improve vehicle jack efficiency and operator safety. Advantageously, this invention may be used with any type of vehicle jack well-known by those having ordinary skill in the art including, but not limited to, scissor jacks, tripod jacks, and hydraulic jacks.

BRIEF DESCRIPTION OF THE FIGURES

These and other features, aspects, and advantages of the present invention will become better understood with regard to the following description, examples, appended claims, and accompanying drawings where:

DETAILED DESCRIPTION OF THE INVENTION

The jack positioning devices of the invention employ a sensor to detect an indicator located at the proper point on the vehicle frame for placement of the vehicle jack and to indicate by light, sound, or both when the jack is aligned with the jack point. As used herein, the term "jack point" means the proper location on the vehicle where a vehicle jack is to make contact with the vehicle during operation of the jack and raising of the vehicle. Preferably, the term jack point means the optimal location on the vehicle frame where the jack acts on the vehicle during operation of the jack and raising of the vehicle. More preferably, the term jack point means a position near the vehicle's tires where a jack makes contact and applies force to raise the vehicle during operation of the jack.

Figure 1:
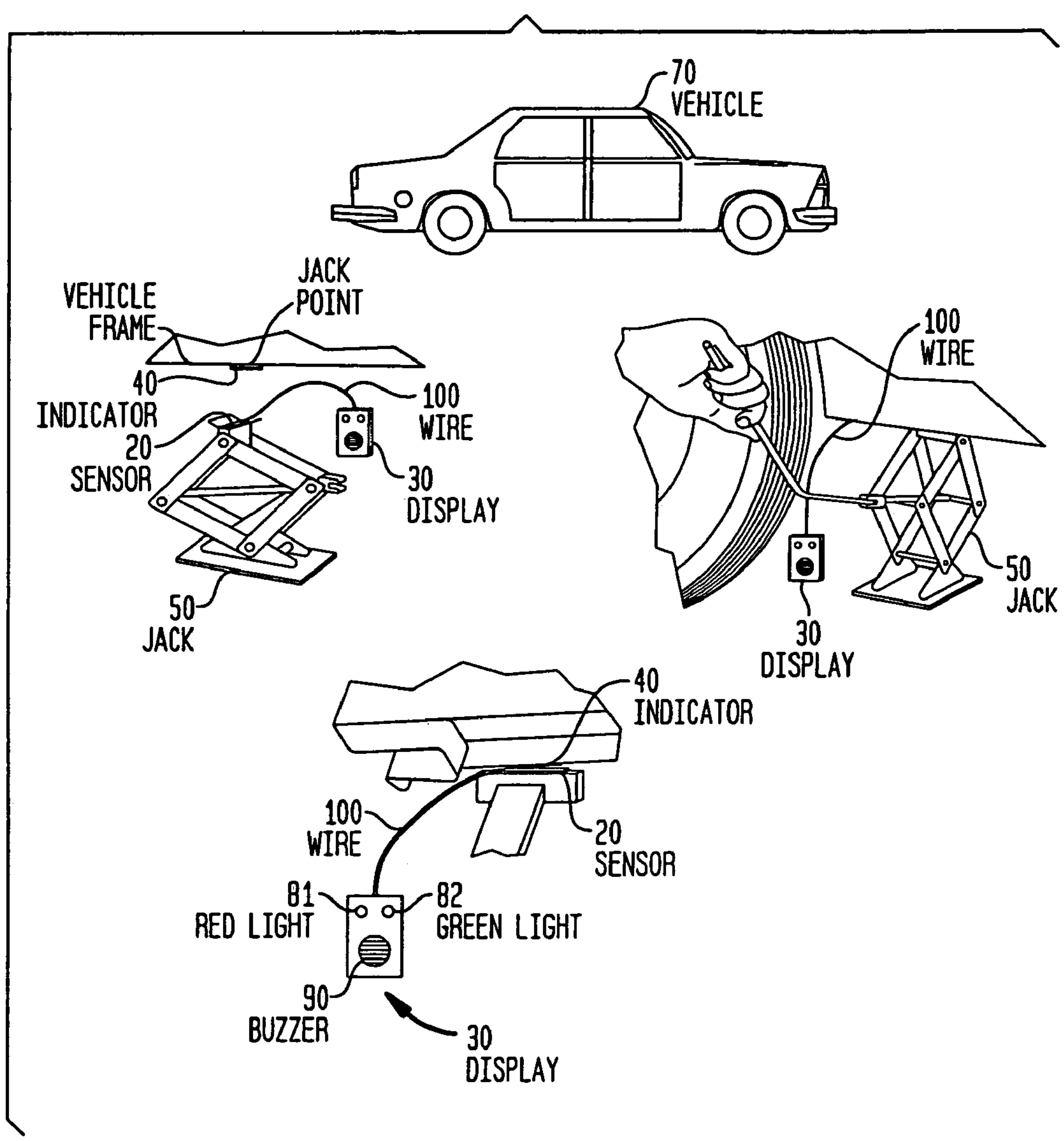
FIG. 1 is a perspective view of a jack positioning device of the present invention depicting the device in operation on a vehicle.
Figure 2:
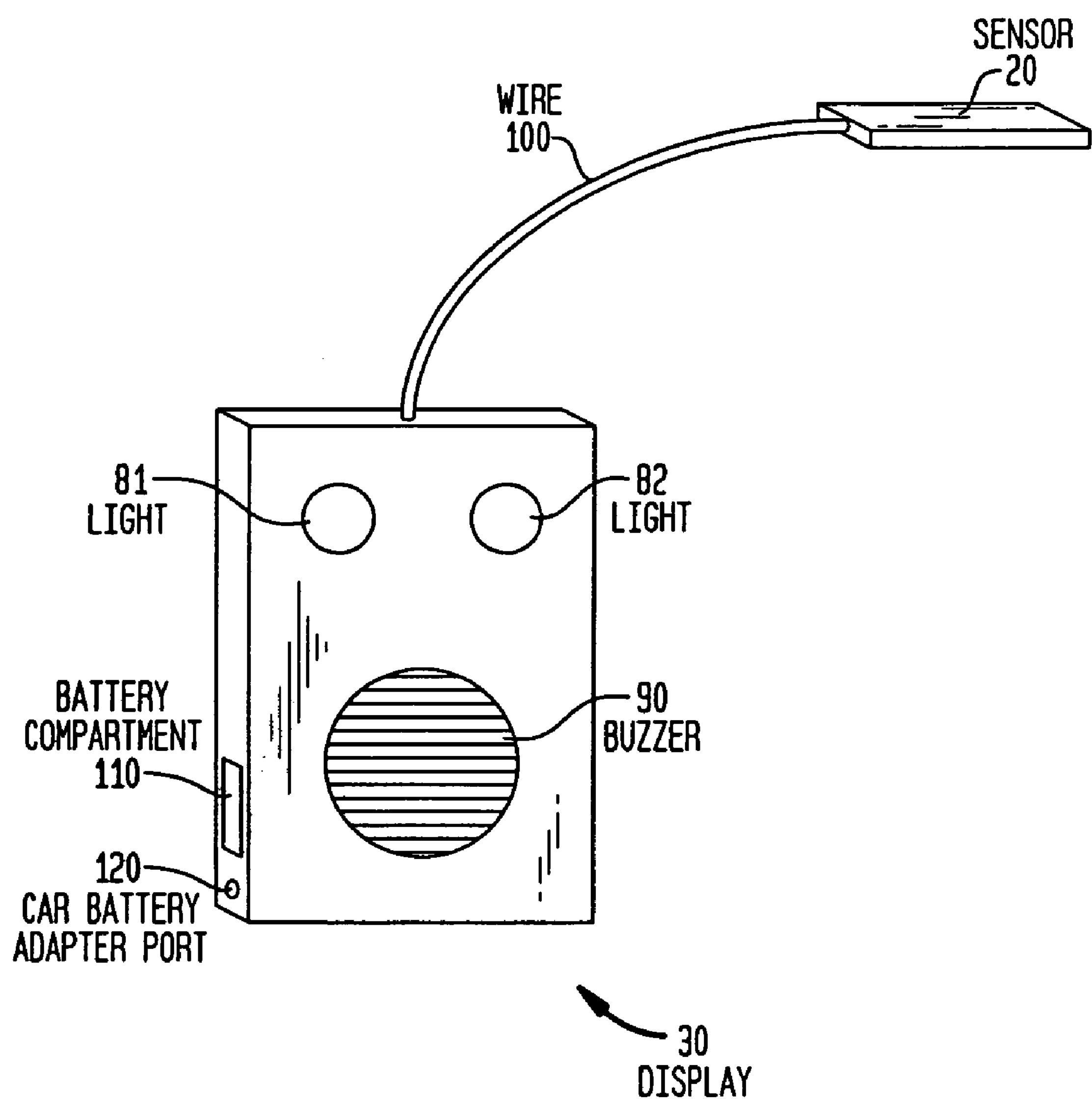
FIG. 2 is a perspective view of a jack positioning device of the present invention.

FIGS. 1 and 2 depict jack positioning device 10 according to the invention. Jack positioning device 10 comprises sensor 20 in communication with display 30. Sensor 20 is adapted to attach to jack 50 or can be machined integrally with jack 50. Preferably, sensor 20 is mounted on or within the portion of jack 50 which aligns and makes contact with vehicle 70 during operation of jack 50. More preferably, sensor 20 is a pad-like structure, i.e. pad 60, which attaches to the portion of jack 50 which makes contact with vehicle 70 during operation of jack 50. Preferably, pad 60 is comprised of a material which can withstand the force applied upon contact of jack 50 and the vehicle frame.

Sensor 20 interacts with indicator 40 located at the jack points of vehicle 70 such that upon placement of sensor 20 in alignment with indicator 40, sensor 20 and indicator 40 communicate with one another.

According to the invention, indicator 40 and sensor 20 may comprise any well known communication means with the important consideration being that indicator 40 and sensor 20 communicate with each other when brought into close physical proximity and in substantial alignment. In operation, sensor 20 detects the presence and location of indicator 40 and communicates the detection via display 30.

Display 30 includes lights 81 and 82. Preferably, light 81 is red and is lit when device 10 is in use and does not detect indicator 40 and light 82 is green and is lit upon detection of indicator 40. It is contemplated that a series of lights may be used on display 30 which indicate a progressive scale or level of alignment wherein the more lights that are lit, the stronger the degree of alignment with or detection of indicator 40 by sensor 20. In addition to, or instead of lights 81, 82, the detection by sensor 20 of indicator 40 may be communicated in an auditory manner, wherein display 30 includes a sound producing device, including but not limited to, buzzer 90. Preferably, sensor 20 and display 30 are connected by and communicate via wire 100.

The energy source for powering sensor 20, indicator 40 and display 30 may be provided by any well-known voltage source, including but not limited to, any commercially available battery. In one embodiment, sensor 20 and display 30 would be powered by one or more batteries held in battery compartment 110. Device 10 includes electrical connections which couple the battery contacts to the electrical contacts of sensor 20 and display 30. Additionally, device 10 may include an on/off switch which controls the powering of the entire device.

Alternatively, device 10 may be powered by the vehicle's battery. In this embodiment, device 10 includes car battery adapter port 120 for mating with the plug of any well-known car battery adapter. In still another embodiment, device 10 may be equipped with both battery compartment 110 for using a commercially available battery and car battery adapter port 120 for using a car battery adapter to connect to the vehicle battery.

In a preferred embodiment of the current invention, indicator 40 comprises a magnetic device and sensor 20 comprises a corresponding magnetic sensor, including, but not limited to, a magnetic field sensor or a magnetic switch which measures magnetic fields and/or magnetic flux, all of which are commonly known by a person having ordinary skill in the art. For example, the magnetic sensor of sensor 20 detects the potential, current, or resistance change caused by the field strength and direction of indicator 40. Then, sensor 20 converts the energy stored in the magnetic field to an electrical signal. The electrical signal is passed to a switch controlling the indicating means of display 30. Preferably, detection of the magnetic field of indicator 40 by the magnetic field sensor of sensor 20 results in the turning off of light 81 and the turning on of light 82 or buzzer 90, thereby indicating to the user of jack 50 the proper alignment of jack 50 with the jack point.

It is contemplated that any magnetic based indicator 40 well known by those having ordinary skill in the art may be employed with the important consideration being that indicator 40 comprise a magnetic source capable of communication with and detection by sensor 20.

Another embodiment of the current invention includes indicator 40 comprising a light-producing device and sensor 20 comprising a light-detecting device. Any light-producing device and light detecting device well-known by those having ordinary skill in the art may be used in this embodiment with the important consideration being that sensor 20 detects light output by indicator 40 when sensor 20 is substantially aligned with the light beam directed from indicator 40. Preferably, sensor 20 can detect the light level, light pulses or modulated infrared light produced by indicator 40. The light-producing device can direct a beam of light along a path wherein when sensor 20 is brought within the path of the light beam it detects the light beam's presence and indicates the detection via display 30. In this embodiment, indicator 40 may comprise a compartment for housing a battery for powering the light producing device.

One example of a light detecting device for use in sensor 20 is a photodiode, which may be used in photocell mode such that the photodiode generates a voltage and current signal when it receives light. The current signal is passed to a switch which controls the indicating means of display 30.

In one embodiment, sensor 20 comprises a photoelectric cell or photocell having electrical characteristics (e.g., current, voltage, or resistance) which vary when light is incident upon it. For example, the photocell can consist of two electrodes separated by a light-sensitive semiconductor material. Optionally, a battery or other voltage source may be connected to the electrodes to establish a current even in the absence of light. When light strikes the semiconductor section of the photocell, the current in the circuit increases by an amount proportional to the intensity of the light. The current is used to operate a switch which controls lights 81, 82 and/or buzzer 90 of display 30.

In an alternative embodiment, a photomultiplier tube is used wherein electrons ejected from a photosensitive cathode by light from sensor 20 are attracted toward and strike a positive electrode, causing showers of secondary electrons drawn to a more positive electrode, producing yet more secondary electrons, through several stages, until a large pulse of current is produced. As described above, this current is used to control a switch or relay which operates lights 81 and 82 and/or buzzer 90 to indicate detection of the jack point to the user via display 30.

Still another example of a light sensor which may be employed in the current invention is a photovoltaic type of photoelectric cell, which, when exposed to light, can generate and support an electric current without being attached to any external voltage source. Such a cell typically consists of a semiconductor crystal with two zones composed of dissimilar materials. When light from indicator 40 shines on the crystal, a voltage is set up across the junction between the two zones. A phototransistor, which is a type of photovoltaic cell, can generate a small current that acts like the input current in a conventional transistor and controls a larger current in the output circuit. As described above, the current generated by the photocell is used to control a switch or relay which controls lights 81,82 and/or buzzer 90 of display 30.

In operation, device 10 is positioned for use with a vehicle and moved until sensor 20 reads or detects indicator 40 located at the proper jack point. If no detection is made, i.e. sensor 20 is not properly aligned with indicator 40, light 81 on display 30 remains lit. Upon detection of indicator 40, sensor 20 provides detection information to display 30 for display to the user. Specifically, light 82 of display 30 will light and/or buzzer 90 will produce a sound. Once the proper jack point is located, the user may operate the jack such that primary contact of jack 50 is made with vehicle 70 at the location determined by device 10.

It is contemplated that indicator 40 of the current invention may be adapted for placement on jack 50 with sensor 20 located on the jack point of the vehicle. In this embodiment, indicator 40 would activate sensor 20 located at the jack point, as described above.

Another embodiment includes sensor 20 comprising a display on the sensor itself. In this embodiment upon detection of indicator 40, sensor would provide an indication of the detection by way of light or sound.

Although the present invention has been described in considerable detail with reference to certain preferred embodiments and versions, other versions and embodiments are possible. Therefore, the spirit and scope of the appended claims should not be limited to the description of the versions and embodiments expressly disclosed herein. The references and disclosure of the Background Section are not admitted to be prior art with respect to the invention.

What is claimed is:

1. A device comprising:

a vehicle jack:

a sensor removably attachable to a portion of the vehicle jack which makes contact with a vehicle during operation of the vehicle jack;

a display in communication with the sensor; and an indicator configured to attach to the vehicle, wherein when the sensor detects the indicator, the display provides an indication to a jack operator.

2. The device of claim 1, wherein the indicator is attached to the vehicle at a jack point.

3. The device of claim 1, wherein the sensor comprises a magnetic sensor.

4. The device of claim 3, wherein the indicator comprises a magnetic device.

5. The device of claim 1, wherein the sensor comprises a light-detecting device.

6. The device of claim 5, wherein the indicator comprises a light-producing device.

7. The device of claim 6, wherein the sensor detects light emitted from the light-producing device.

8. The device of claim 6, wherein the light-producing device is a fiber optic light source.

9. The device of claim 6, wherein the light-producing device is a light emitting diode.

10. The device of claim 6, wherein the light-producing device is an infrared light.

11. The device of claim 1, wherein the display comprises a light.

12. The device of claim 11, wherein the light comprises a light emitting diode.

13. The device of claim 1, wherein the display comprises a sound producing device.

14. The device of claim 13, wherein the sound producing device comprises a buzzer.

15. The device of claim 1, wherein the device comprises a port for accepting a car battery adapter.

16. The device of claim 1, wherein the device comprises a compartment for housing at least one battery.

17. A kit comprising:

a vehicle jack;

an indicator configured to attach to a vehicle;

a sensor for detecting the indicator, wherein the sensor is removably attachable to a portion of the vehicle jack which makes contact with the vehicle during operation of the vehicle jack; and a display for indicating to a vehicle jack user when the sensor detects the indicator.

18. The kit of claim 17, wherein the indicator is adapted to attach to the vehicle at a jack point.

19. The kit of claim 17, wherein the indicator comprises a magnetic device.

20. The kit of claim 19, wherein the sensor comprises a magnetic sensor.

21. The kit of claim 17, wherein the indicator comprises a light-producing device.

22. The kit of claim 21, wherein the sensor comprises a light-detecting device.

23. The kit of claim 21, wherein the indicator comprises a fiber optic light.

24. The kit of claim 21, wherein the indicator comprises a light emitting diode.

25. The kit of claim 17, wherein the sensor is attached to the vehicle jack.

26. The kit of claim 17, wherein the display comprises a light.

27. The kit of claim 26, wherein the light comprises a light emitting diode.

28. The kit of claim 17, wherein the display comprises a sound producing device.

29. The kit of claim 28, wherein the sound producing device comprises a buzzer.

30. The kit of claim 17, wherein the device comprises a port for accepting a car battery adapter.

31. The kit of claim 30 further comprising a car battery adapter.

32. The kit of claim 17, wherein the device comprises a compartment for housing at least one battery.

33. A vehicle jack comprising:

a base;

a head;

an actuator;

a sensor attached to the head; and a display in communication with the sensor, wherein when the sensor detects an indicator located at a jack point, the display provides an indication to a jack operator.

34. The vehicle jack of claim 33, wherein the sensor is integral with the head.

35. A device comprising:

a vehicle jack;

a sensor configured to attach to a jack point;

a display in communication with the sensor; and an indicator adapted to removably attach to a portion of the vehicle jack which makes contact with the vehicle during operation of the jack, wherein when the sensor detects the indicator, the display provides an indication to a jack operator.

36. A method of locating a point on a vehicle for placement of a vehicle jack comprising the steps of:

placing an indicator on the vehicle at a jack point; and using a sensor removably attached to a portion of the vehicle jack which makes contact with the vehicle during operation of the jack to detect the location of the indicator.

37. The method of claim 36 further comprising communicating the detection of the jack point to a jack operator via a display attached to the sensor.

* * * * *